(12) United States Patent
Yamamoto et al.

(10) Patent No.: US 7,286,307 B2
(45) Date of Patent: Oct. 23, 2007

(54) METHOD FOR FIXING OPTICAL MEMBER AND OPTICAL UNIT

(75) Inventors: Harushige Yamamoto, Yamato (JP); Masato Seita, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 136 days.

(21) Appl. No.: 11/113,596

(22) Filed: Apr. 25, 2005

(65) Prior Publication Data

US 2005/0243443 A1    Nov. 3, 2005

(30) Foreign Application Priority Data

| Apr. 28, 2004 | (JP) | ............................... 2004-132601 |
| Apr. 28, 2004 | (JP) | ............................... 2004-132602 |
| Jun. 2, 2004 | (JP) | ............................... 2004-163922 |

(51) Int. Cl.
*G02B 7/02* (2006.01)

(52) U.S. Cl. ...................... 359/819; 359/811; 359/822; 385/92

(58) Field of Classification Search ................ 359/811, 359/819, 830, 822; 351/178; 219/121.6, 219/121.65, 121.66; 385/88, 92

See application file for complete search history.

(56) References Cited

U.S. PATENT DOCUMENTS

| 1,709,209 | A | * | 4/1929 | Gammeter | .................. 474/259 |
| 2,471,933 | A | * | 5/1949 | Christensen | ................. 285/349 |
| 2,509,672 | A | * | 5/1950 | Christensen | ................. 277/455 |
| 4,737,017 | A | * | 4/1988 | Nagasaka | .................... 359/811 |
| 5,469,230 | A | * | 11/1995 | Murai et al. | ................... 351/52 |
| 6,157,501 | A | * | 12/2000 | Sato et al. | ................... 359/819 |
| 6,159,242 | A | * | 12/2000 | Yamasita et al. | .......... 623/6.46 |
| 6,239,925 | B1 | * | 5/2001 | Ardrey et al. | ............... 359/819 |
| 6,820,445 | B2 | * | 11/2004 | Gratrix | ......................... 65/387 |
| 6,825,997 | B2 | * | 11/2004 | Hubbard et al. | ............ 359/819 |
| 2002/0149861 | A1 | * | 10/2002 | Yonemura | .................... 359/808 |

FOREIGN PATENT DOCUMENTS

| JP | 2003-123506 A |   | 4/2003 |
| JP | 2003-123512 A |   | 4/2003 |
| JP | 2003123506 A | * | 4/2003 |
| JP | 2004-20867 A |   | 1/2004 |

* cited by examiner

*Primary Examiner*—Scott J. Sugarman
*Assistant Examiner*—James R Greece

(57) ABSTRACT

A method for fixing an optical member of an optical unit including the optical member and a holding member is provided. The holding member includes positioning portions for positioning the optical member. The optical member and the holding member are fixed to each other upon laser welding of a plurality of locations of the holding member other than the positioning portions.

12 Claims, 15 Drawing Sheets

METHOD FOR FIXING OPTICAL MEMBER AND OPTICAL UNIT

BACKGROUND OF THE INVENTION

1. Field of the Invention

The present invention relates to an optical unit in which an optical member such as a pickup lens and a holding member are fixed to each other by laser welding by using laser light and to a method for fixing the optical member.

2. Description of the Related Art

The following methods for fixing an optical member such as a lens are hitherto known.

(1) After inserting a lens in a lens-holding member composed of a resin, the lens is fixed to the peripheral front edge of the lens-holding member by known thermal caulking or the like; and (2) The external periphery of a lens and a lens-holding member are fixed to each other with a UV cure adhesive or the like.

Unfortunately, according to the method (1), a caulking tool melts the peripheral front edge of the lens-holding member by heat so as to cover the peripheral front edge of the lens, thereby leading to a longer time for caulking and an increase in assembling steps, accordingly resulting in an increased cost. Also, since the external periphery of the lens-holding member must be melted by heat with the caulking tool so as to have the peripheral front edge of the lens fixed thereto, the lens-holding member and the lens are inevitable subjected to a pressing force, thereby causing a guarantee problem of the positioning accuracy of the lens after assembly.

Also, according to the method (2), in a time period after application of a UV cure adhesive to irradiation of a ultra-violet ray, the liquid adhesive is flown out onto the peripheral surface of the lens-holding member, and when the flown-out adhesive is solidified with ultra-violet radiation, the solidified adhesive interferes with components around the solidified adhesive after assembly, thereby causing poor operation, especially deteriorating optical performance. Also, the liquid adhesive flows inside the lens through a gap between the lens-holding member and the external periphery of the lens, thereby causing a guarantee problem of the optical performance of the lens, or the like.

In order to solve these problems, Japanese Patent Laid-Open No. 2003-123512 discloses a method in which two resins are fixed to each other by laser welding. More particularly, a lens unit is made up by an outer lens composed of a transparent thermoplastic resin and a housing composed of a thermoplastic resin absorbent to laser light, and the housing and the outer lens are welded with each other by emitting laser light from a side wall of the outer lens in a state in which the external periphery of the housing and the side wall are abutted against each other.

Also, methods for fixing an optical member such as a plastic lens to a lens frame or the like composed of a plastic by using laser light are disclosed. For example, Japanese Patent Laid-Open No. 2004-20867 discloses a method for fixing a plastic lens to, for example, a plastic lens-frame or a plastic finder frame by irradiating the lens-frame or the finder-frame with laser light.

In addition, Japanese Patent Laid-Open No. 2003-123506 discloses a method in which an outer lens composed of a transparent thermoplastic resin and a housing composed of another thermoplastic resin absorbent to laser light are welded with each other by irradiating the entire periphery of an inner sheet composed of a transparent thermoplastic resin with laser light from the outer lens side in a state in which the inner sheet is sandwiched at the abutment portion between the outer lens and the housing.

SUMMARY OF THE INVENTION

The present invention is directed to a method for fixing an optical member to a holding member. In one aspect of the present invention, a method for fixing an optical member to a holding member includes the steps of inserting the optical member in the holding member; and irradiating the holding member with a plurality of beams of laser light substantially at the same time, passing through the optical member.

The present invention is also directed to a holding member for holding an optical member. In another aspect of the present invention, a holding member, holding an optical member and fixed by a laser irradiation process, includes a plurality of positioning portions adapted to contact with the optical member so as to position the optical member prior to the laser irradiation process; and a plurality of laser irradiation portions protruding lower than the positioning portions and being irradiated with the laser light in the laser irradiation process.

The present invention is further directed to an optical unit. In yet another aspect, an optical unit includes an optical member; a holding member holding the optical member and having a wall formed therein so as to face an external periphery of the optical member; and an intermediate member disposed between the external periphery of the optical member and the wall of the holding member, the intermediate member including a thermoplastic resin absorbent to laser light such that at least a part of the intermediate member is melted upon irradiation with laser light so as to fix the optical member to the holding member.

Further features and advantages of the present invention will become apparent from the following description of exemplary embodiments with reference to the attached drawings.

DESCRIPTION OF THE EMBODIMENTS

First Embodiment

Figure 1:
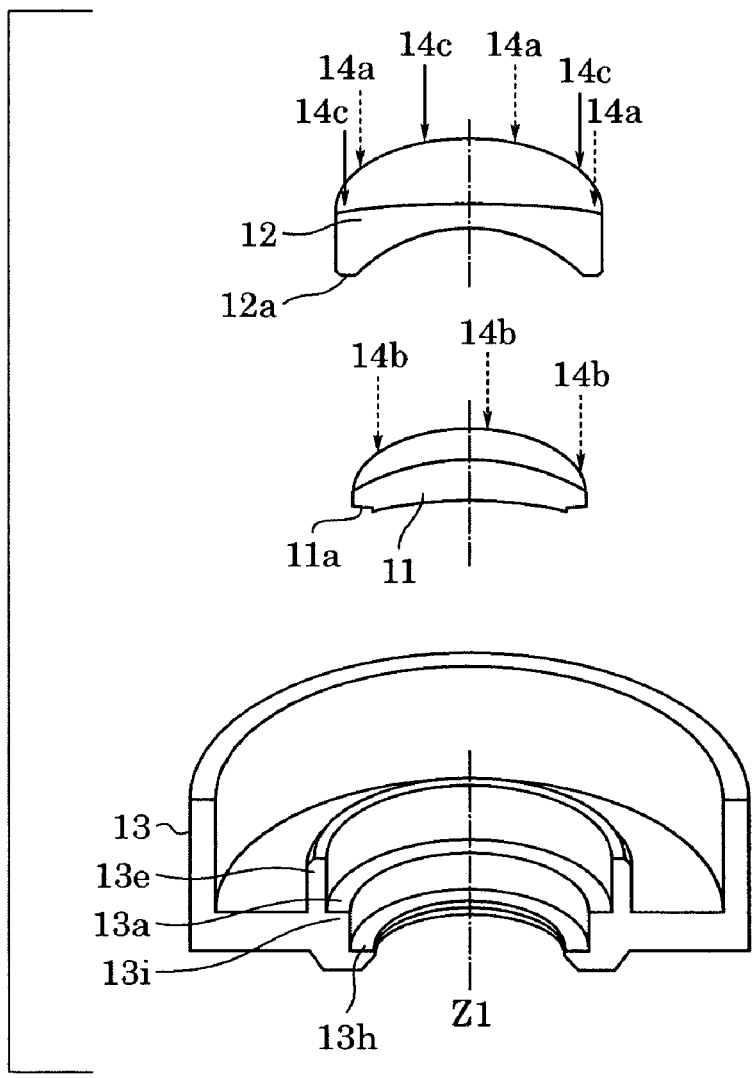
FIG. 1 is a perspective sectional view of a lens unit, illustrating a method for fixing a lens, according to a first embodiment of the present invention.

FIG. 1 is a perspective sectional view of a lens unit, illustrating a method for fixing a lens according to a first embodiment.

The lens-fixing method according to the first embodiment will be described. A first lens 11 is fitted into a lens frame 13 such that a positioning portion 11a of the first lens 11 is abutted against a first-lens positioning portion 13h of the lens frame 13. Then, a second lens 12 is fitted into the lens frame 13 such that a positioning portion 12a of the second lens 12 is abutted against a second-lens positioning portion 13a of the lens frame 13. In this state, the optical axes of the first and second lenses 11 and 12 are aligned with a virtual axis Z1. Since the external peripheral dimension of each of walls 13i and 13e of the lens frame 13 is slightly greater than that each of the first and second lenses 11 and 12, the position of each of the first and second lenses 11 and 12 can be adjusted in a direction orthogonal to the axis Z1 by making use of the above clearance. Accordingly, the optical axis of each lens can be aligned with the axis Z1 by certain methods (not shown). Then, a plurality of locations of each lens is spot-irradiated with laser light at the same time from above the lens. Regarding laser irradiation, the second lens 12 may be irradiated with laser light 14a after irradiation of the first lens 11 with laser light 14b, or both lenses may be irradiated with the laser light 14a and 14b at the same time. Alternative, after fixing either one of the lenses with an adhesive or the like, the other lens may be irradiated with laser light. Further, in order to increase a fixing strength, laser irradiation may be performed a plurality of times while changing laser irradiation locations of each lens.

Since most part of laser light passes through the lenses, most part of its energy reaches the lens frame 13. The lens frame 13 is composed of a plastic absorbing energy in a range of wavelengths of laser light.

Figure 2:
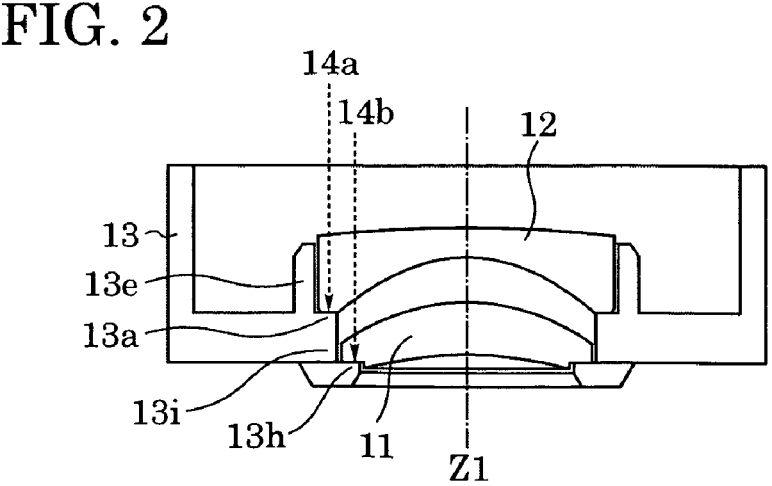
FIG. 2 is a sectional view of the lens unit, illustrating the method for fixing a lens, according to the first embodiment.

FIG. 2 is a sectional view of the lens unit, illustrating the method for fixing a lens by laser irradiation, according to the first embodiment.

An example fixing method of simultaneously irradiating the two beams of laser light 14a and 14b will be described. The beams 14a and 14b of laser light are absorbed at the respective lens-positioning portions 13a and 13h of the lens frame 13, are changed into heat, and cause the margin of each laser irradiation portion to be melted. The melted part of plastic constituting the lens frame 13 enters fine irregularities of the lens surfaces of abutment portions (that is, the positioning portions) 11a and 12a of the first lens 11 at which the plastic is abutted against the first and second lenses 11 and 12, respectively.

When the laser irradiation is stopped, although the melted part of plastic is quickly cooled and contracts, at least a part of the plastic entering the fine irregularities of the lens surfaces remains in the irregularities, thereby resulting in fixing the lenses and the lens frame to each. The above-mentioned lens-fixing portions are formed at a plurality of locations of the lens-positioning portions 13a and 13h at the same time, whereby the first and second lenses 11 and 12 are fixed to the lens frame 13 without inclination relative to the axis Z1.

Figure 11:
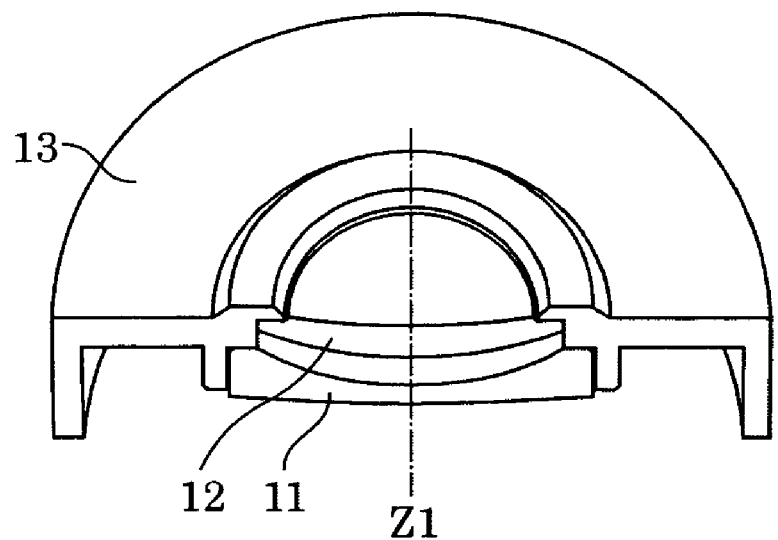
FIG. 11 is a perspective sectional view of the lens unit fixed to a lens frame, according to the lens fixing method of the first embodiment, viewed from an opposite direction to a laser irradiation direction.

FIG. 11 is a perspective sectional view of a lens assembly assembled by the lens fixing method according to the first embodiment, viewed from an opposite direction to a laser irradiation direction.

Second Embodiment

Figure 3:
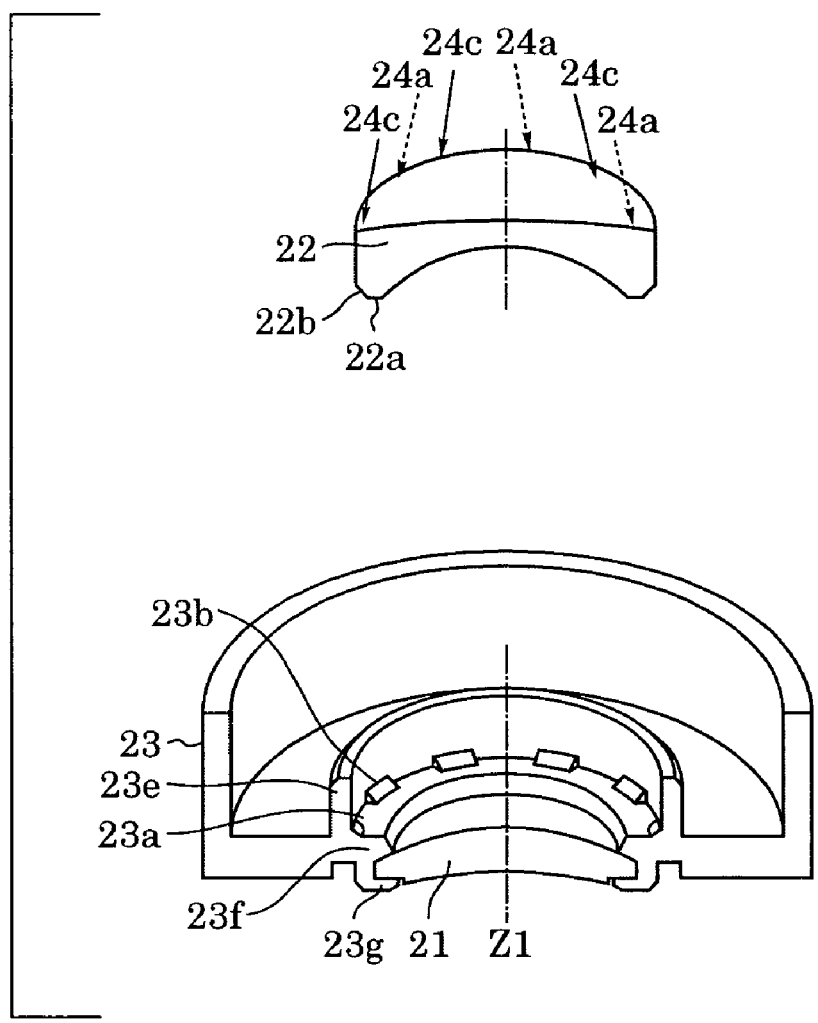
FIG. 3 is a perspective sectional view of a lens unit, illustrating a method for fixing a lens, according to a second embodiment of the present invention.

FIG. 3 is a perspective sectional view of a lens unit, illustrating a method for fixing a lens, according to a second embodiment.

The lens-fixing method according to the second embodiment will be described. As shown in FIG. 3, after being abutted against a lens-fixing portion 23f of a lens frame 23 from below the lens frame 23, a first lens 21 is fixed to the lens frame 23 by deforming a portion 23g of the lens frame 23 by thermal caulking or the like.

Then, a second lens 22 is fitted into the lens frame 23 such that a positioning portion 22a of the second lens 22 is abutted against a second-lens positioning portion 23a of the lens frame 23. The lens frame 23 has a plurality of laser-irradiation portions 23b disposed therein. Although the laser-irradiation portions 23b are formed so as to face an external peripheral corner 22b of the second lens 22, the laser-irradiation portions 23b and the external peripheral corner 22b of the second lens 22 do not contact each other. In this state, the optical axes of the first and second lenses 21 and 22 are aligned with the virtual axis Z1. Since the external peripheral dimension of a wall 23e of the lens frame 23 is slightly greater than that of the second lens 22, by making use of this clearance, the optical axis of the second lens 22 can be aligned with the axis Z1 with the method (not shown) as in the first embodiment. Then, a plurality of locations of each lens is spot-irradiated with laser light at the same time from above the lens. The irradiation direction of the laser light may be parallel to the optical axis of the lens or orthogonal to the laser-irradiation portions 23b. Alternatively, after irradiation with a plurality of beams of laser light 24a, another plurality of laser irradiation portions may be irradiated with laser light 24c.

Figure 4:
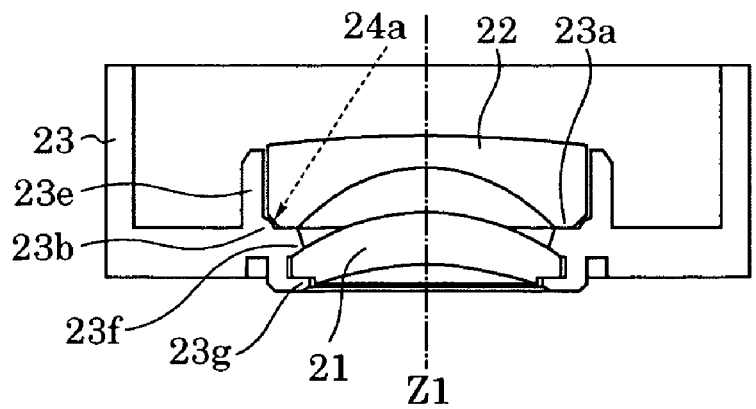
FIG. 4 is a sectional view of the lens unit, illustrating the method for fixing a lens, according to the second embodiment.

FIG. 4 is a sectional view of the lens unit, illustrating the method for fixing a lens by laser irradiation, according to the second embodiment.

The laser light 24a passes through the lens, is absorbed at the laser-irradiation portion 23a of the lens frame 23, is changed into heat, and causes the margin of each laser irradiation portion to be melted. The melted part of plastic constituting the lens frame expands thermally, comes into contact with the external peripheral corner 22b of the second lens 22, and resultantly enters fine irregularities of the lens surfaces.

When the laser irradiation is stopped, although the melted part of plastic is quickly cooled and contracts, at least a part of the plastic entering the fine irregularities of the lens surfaces remains in the irregularities, whereby the lenses and the lens frame are fixed to each other. Since the laser-irradiation portions 23b are formed at locations of the lens frame 23 other than the lens-positioning portion 23a, and the lens-positioning portion 23a is not irradiated with laser light, the lens-positioning portion 23a is not thermally deformed. Also, a plurality of the laser-irradiation portions 23b is irradiated with the laser light 24a substantially at the same time, whereby the second lens 22 is fixed to the lens frame 23 without inclination relative to the axis Z1.

Figure 12:
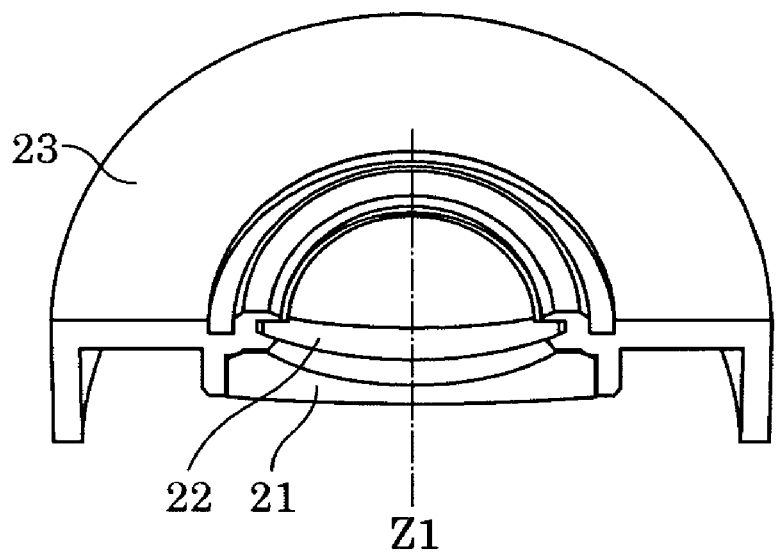
FIG. 12 is a perspective sectional view of the lens unit fixed to the lens frame, according to the lens fixing method of the second embodiment, viewed from an opposite direction to a laser irradiation direction.

FIG. 12 is a perspective sectional view of a lens assembly assembled by the lens fixing method according to the second embodiment, viewed from an opposite direction to a laser irradiation direction.

Third Embodiment

Figure 5:
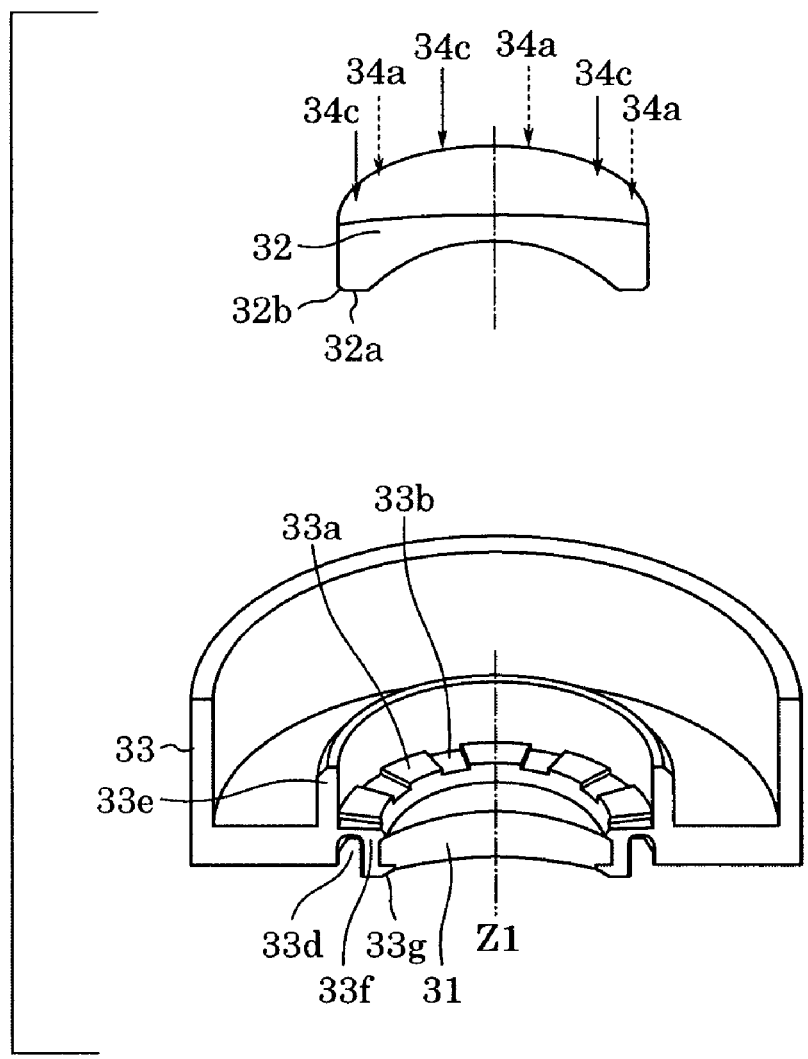
FIG. 5 is a perspective sectional view of a lens unit, illustrating a method for fixing a lens, according to a third embodiment of the present invention.
Figure 6:
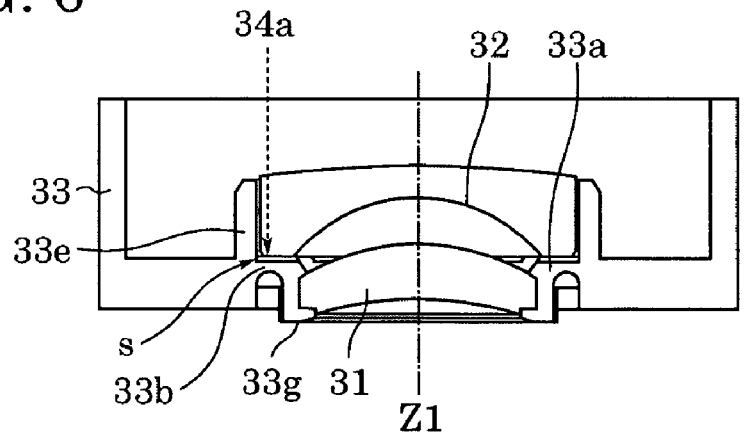
FIG. 6 is a sectional view of the lens unit, illustrating the method for fixing a lens, according to the third embodiment.

FIG. 5 is a perspective sectional view of a lens unit for fixing a lens according to a third embodiment, and FIG. 6 is a sectional view of the lens unit, illustrating the method for fixing a lens by laser irradiation, according to the third embodiment. Only parts different from those in the second embodiments will be described.

A second lens 32 is fitted into a lens frame 33 such that a positioning portion 32a of the second lens 32 is abutted against positioning portions 33a of a lens frame 33. The lens frame 33 has pluralities of the lens-positioning portions 33a and laser-irradiation portions 33b alternately disposed therein. The laser-irradiation portions 33b lie lower than the lens-positioning portions 33a. In a state in which the second lens 32 is fitted in the lens frame 33, the laser-irradiation portions 33b and the second lens 32 have a gap s formed therebetween. In the same fashion as in the first embodiment, the optical axes of first and second lenses 31 and 32 are aligned with the virtual axis Z1 in this state. Then, laser light 34a is emitted towards the laser-irradiation portions 33b. Upon being absorbed at the laser-irradiation portions 33b of the lens frame 33, the laser light 34a is changed into heat and causes the margin of each laser irradiation portion to be melted. The melted part of plastic constituting the lens frame 33 expands thermally and comes into contact with the positioning portion 32a of the second lens 32, thereby resulting in the melted portion entering irregularities of the lens surfaces. The gap s can lie in a region smaller than about 0.1 mm. When the gap s greater than 0.1 mm, a larger amount of energy is needed for thermally expanding the lens frame so as to cause the lens and lens frame to come into contact with each other; hence requiring a larger volume of the melted part of plastic, leading to greater thermal influence on components around the melted part.

When the laser irradiation of the laser light 34a is stopped, although the melted part of plastic is quickly cooled and contracts, at least a part of the plastic entering the abutment with the lens remains in the abutment, thereby resulting in fixing the lens and the lens frame to each other. Since the laser-irradiation portions 33b and the lens-positioning portions 33a are formed at mutually different locations of the lens frame 33, and the laser light 34a is not emitted towards the lens-positioning portions 33a, the lens-positioning portions 33a are not thermally deformed. The lens frame 33 has a thickness-reduced portion 33d formed at the back of the laser-irradiation portions 33b so as to be thinner than other parts thereof around the laser-irradiation portions 33b. With the thickness-reduced portion 33d, a contracting action of the melted part of plastic advances quickly, and also, the lens frame 33 holds an elastic force obtained due to reduction in thickness, even after the lens is fixed to the lens frame. Since a plurality of the laser-irradiation portions 33b are irradiated with the laser light 34a substantially at the same time, the second lens 32 is fixed without inclination relative to the axis Z1. In addition, due to the elastic force, the lens frame has a force pressing the lens against the lens-positioning portions 33a and also another force restoring the lens against an external force such as shock.

Figure 13:
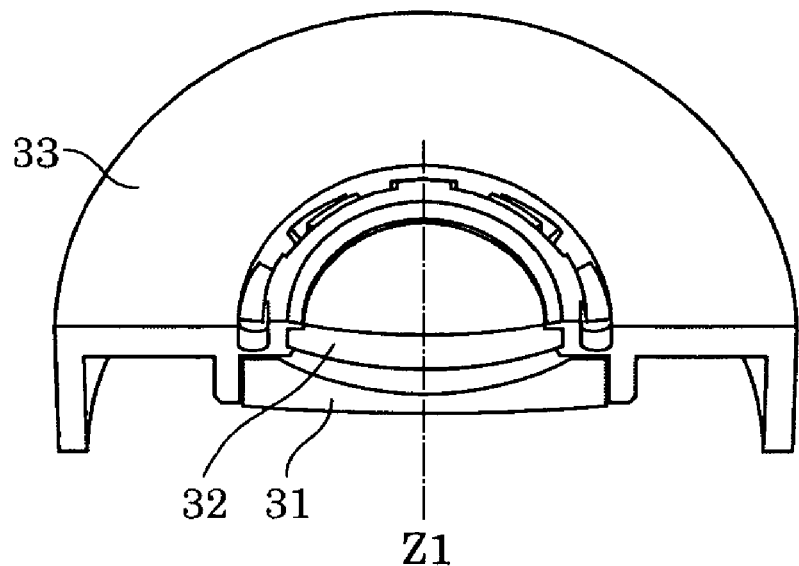
FIG. 13 is a perspective sectional view of the lens unit fixed to the lens frame according to the lens fixing method of each of the third and fourth embodiments, viewed from an opposite direction to a laser irradiation direction.
Figure 14:
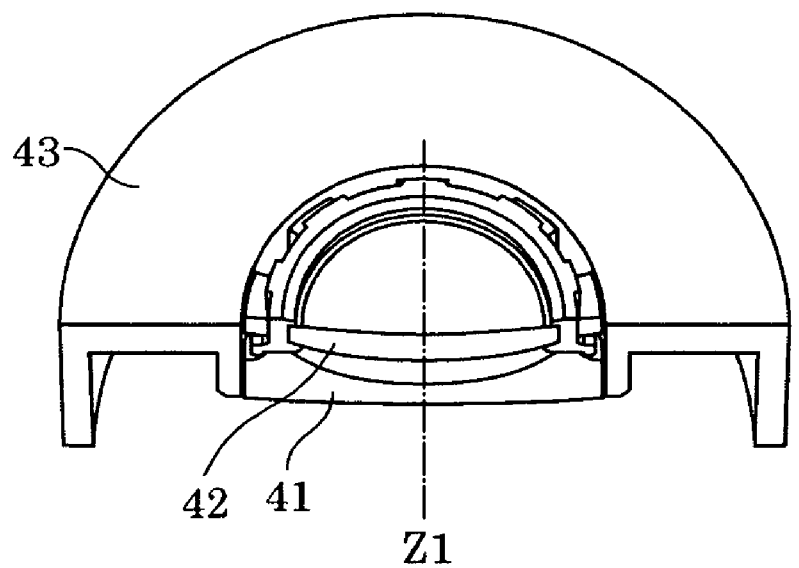
FIG. 14 is a perspective sectional view of the lens unit fixed to a lens frame, according to the lens fixing method of the first embodiment, viewed from an opposite direction to a laser irradiation direction.

FIG. 13 is a perspective sectional view of a lens assembly assembled by the lens fixing method according to the third embodiment, viewed from an opposite direction to a laser irradiation direction.

Fourth Embodiment

Figure 7:
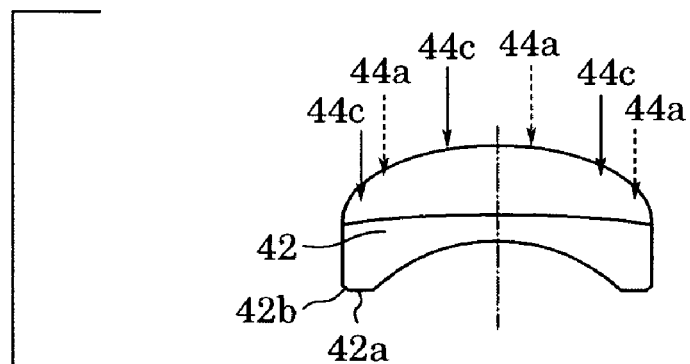
FIG. 7 is a perspective sectional view of a lens unit, illustrating a method for fixing a lens, according to a fourth embodiment of the present invention.
Figure 7:
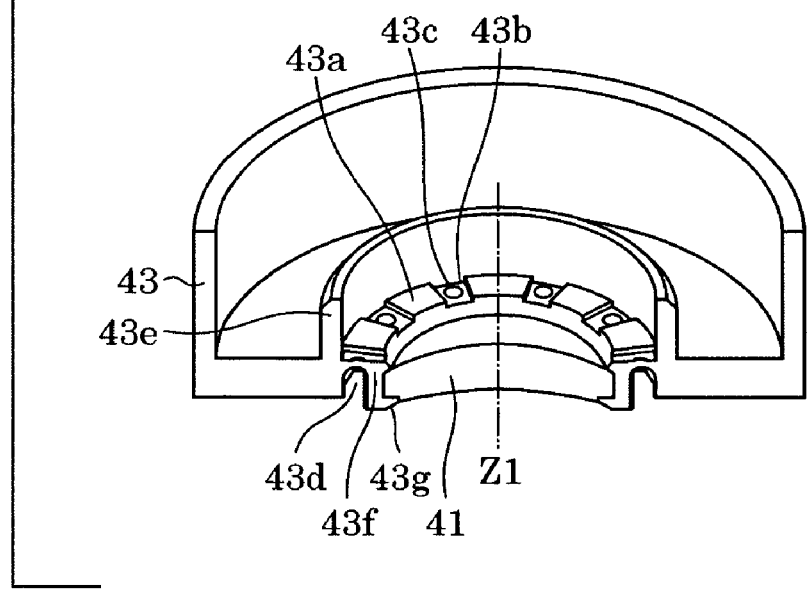
Figure 8:
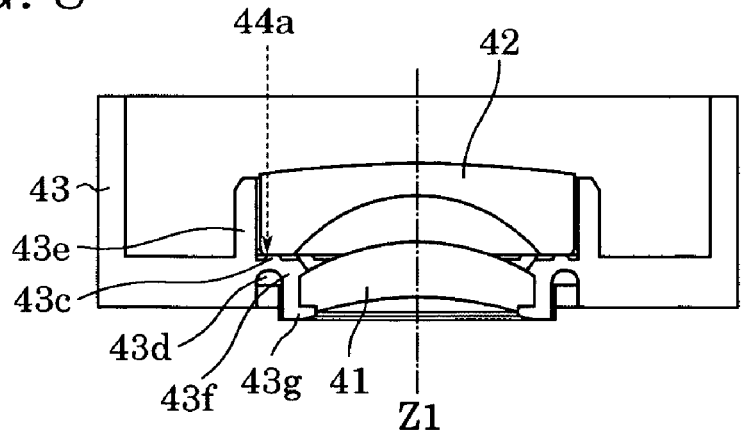
FIG. 8 is a sectional view of the lens unit, illustrating the method for fixing a lens, according to the fourth embodiment.

FIG. 7 is a perspective sectional view of a lens unit, illustrating a method for fixing a lens according to a fourth embodiment, and FIG. 8 is a sectional view of the lens unit, illustrating the method for fixing a lens by laser irradiation, according to the fourth embodiment. Only parts different from those in the third embodiment will be described.

A lens frame 43 has pluralities of lens-positioning portions 43a and laser irradiation surfaces 43b alternately disposed therein. Each of the laser irradiation surfaces 43b has a spherical projection 43c formed thereon. The laser irradiation surfaces 43b lie lower than the lens-positioning portions 43a. In a state in which a second lens 42 is fitted in the lens frame 43 such that the surface of the second lens 42 is abutted against the lens-positioning portions 43a, the projection 43c additionally formed on the corresponding laser irradiation surface 43b does not come into contact with the second lens 42. Further, even when the second lens 42 is somewhat moved for adjusting its optical axis, the optical axis can be aligned without affecting its positioning accuracy.

While the laser irradiation surfaces are flush with one another in the third embodiment, in the fourth embodiment, only the projections 43c formed on the respective laser irradiation surfaces 43b are irradiated with laser light. With this arrangement, a lesser amount of heat is transferred to the lens-positioning portions 43a.

The projection 43c on the corresponding laser irradiation surface 43b is not limited to having a spherical shape and may have a shape such as a cylindrical or prismatic shape.

Fifth Embodiment

Figure 9:
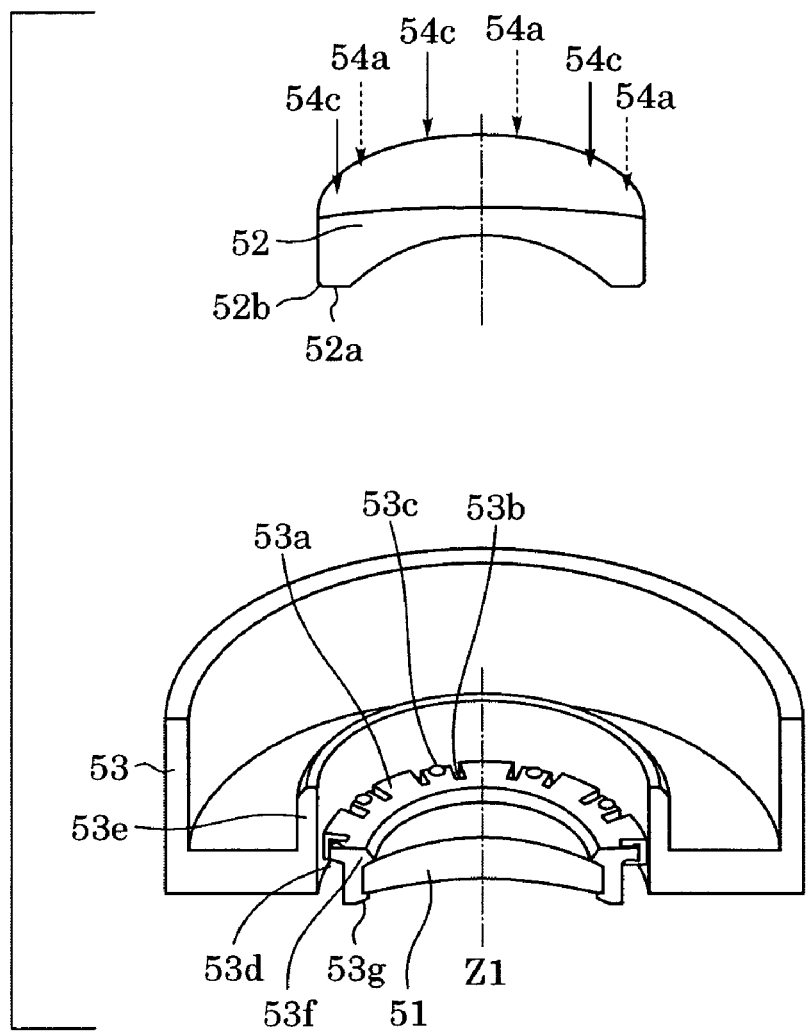
FIG. 9 is a perspective sectional view of a lens unit, illustrating a method for fixing a lens, according to a fifth embodiment of the present invention.
Figure 10:
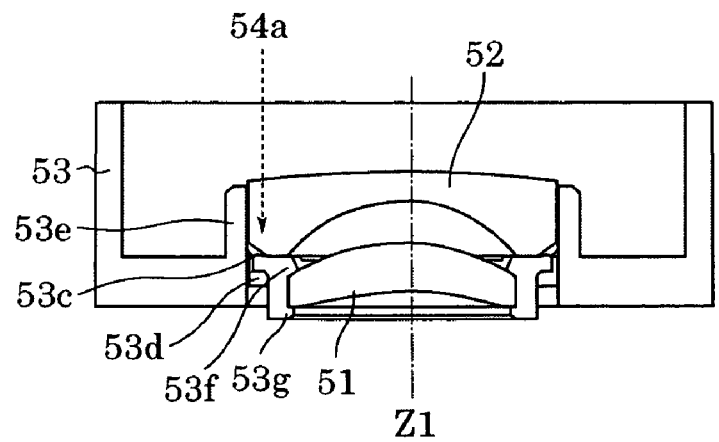
FIG. 10 is a sectional view of the lens unit, illustrating the method for fixing a lens, according to the fifth embodiment.

FIG. 9 is a perspective sectional view of a lens unit, illustrating a method for fixing a lens according to a fifth embodiment of the present invention, and FIG. 10 is a sectional view of the lens unit, illustrating the method for fixing a lens by laser irradiation, according to the first embodiment. Only parts different from those in the fourth embodiment will be described.

A lens frame 53 has pluralities of lens-positioning portions 53a and laser irradiation portions 53b alternately disposed therein, and the laser irradiation portions 53b have cuts formed at the margin thereof and cut away from a wall 53e of the lens frame 53. In addition, the laser irradiation surfaces 53b have projections 53c formed thereon. A second lens 52 includes a positioning surface 52a for being positioned with respect to the lens frame and a slope 52b facing the laser-irradiation portions 53b. Although the lenses are fixed to the lens frame by irradiating the projections 53c formed on the laser irradiation surfaces 53b with laser light 54 in the same fashion as in above-described embodiments, since the laser-irradiation portions 53b have the cuts at the margin thereof, a thermal contraction force after irradiation of the laser light is more likely exerted on the second lens 52 towards the lens-positioning portions 53a than in the other embodiments, and also, an elastic force is likely exerted on the laser-irradiation portions 53b, thereby more effectively preventing the lenses from disengagement from the lens frame due to shock or the like than in the other embodiments.

While a plurality of locations is irradiated with laser light at the same time in each of the above-described embodiments, the locations are not irradiated at the same time in a narrow sense and may be irradiated with the laser light in a time range of, for example, several tens to several hundred milliseconds as long as the time range does not adversely affect positional accuracy of the lenses.

When a lens to be fixed is composed of glass in each embodiment, in order to increase the welding strength of the lens with the melted part of plastic, the surface of a welding portion of the lens may be processed so as to be rougher than the curved surface of the lens or may be subjected to a primer process.

Also, a lens to be fixed may be composed of plastic in each embodiment.

In the case of a plastic lens, the lens and the lens frame may be welded with each other such that heat of the lens frame melted due to laser irradiation causes a part of the plastic lens to be melted and to be thus chemically bonded to the plastic constituting the lens frame.

A member to be fixed is not limited to a lens and may be an optical element such as a transparent glass, a plastic plate or an optical filter.

Sixth Embodiment

Figure 15:
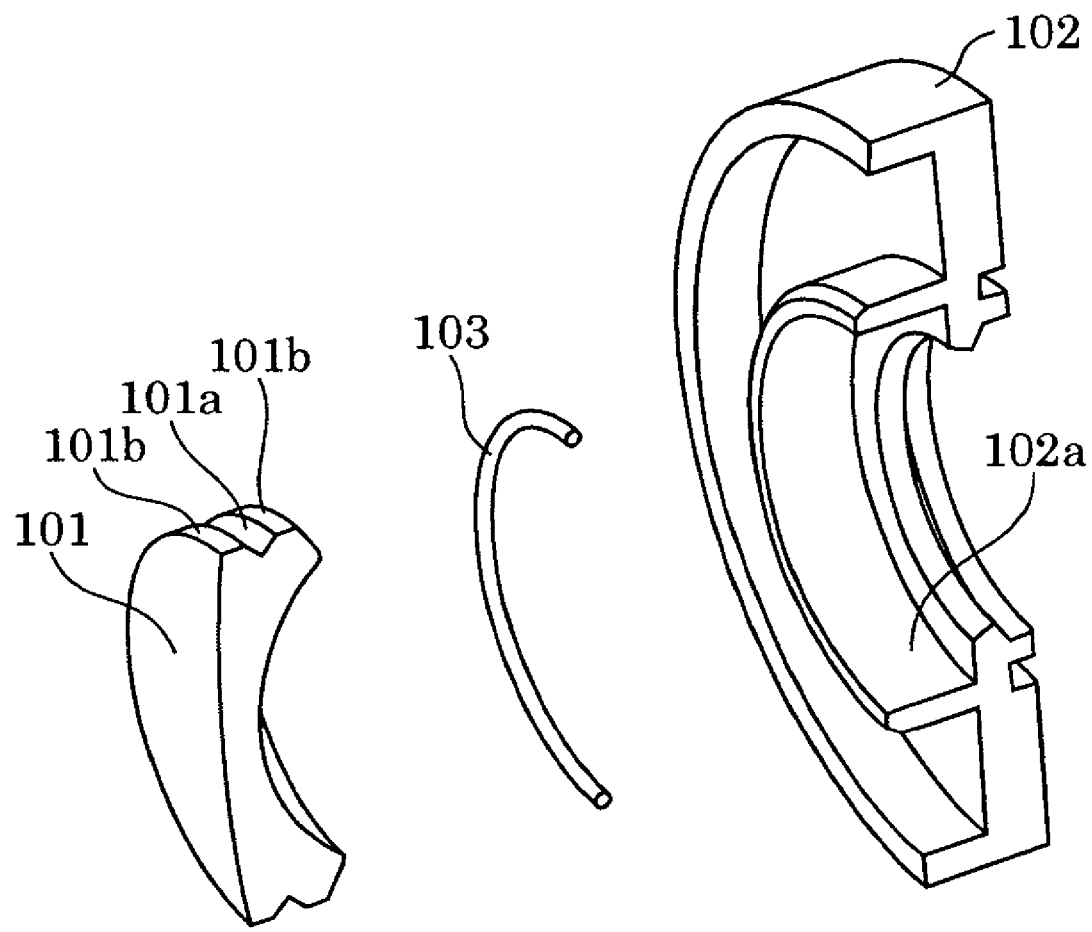
FIG. 15 is a perspective sectional view of a major part of an optical unit according to a sixth embodiment of the present invention.
Figure 16:
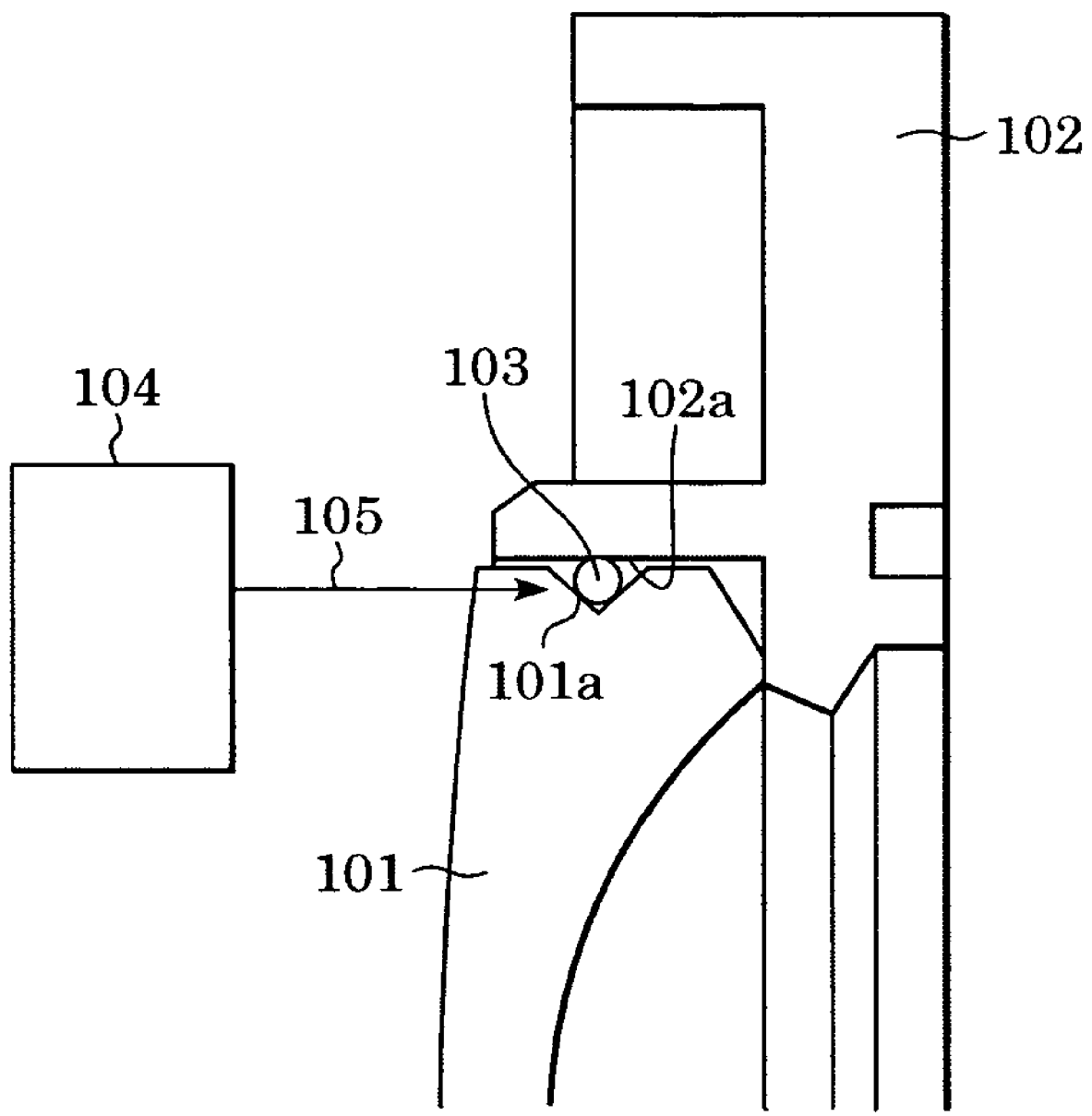
FIG. 16 is a perspective sectional view of a major part of the optical unit according to the sixth embodiment, having a lens inserted therein.

FIGS. 15 and 16 illustrate an optical unit inserted in a camera, according to a sixth embodiment of the present invention. More particularly, FIG. 15 is a perspective sectional view of a major part of the optical unit, and FIG. 16 is a sectional view of a major part of the optical unit, illustrating a state in which the optical unit is completely inserted.

As shown in these figures, the lens unit includes a lens 101 which serves as one of optical members forming an image of pickup light from a subject onto a pickup element (not shown) and which has a depression 101a having a substantially V-shaped cross-portion formed on the external peripheral surface thereof; a lens-holding member 102 holding the lens 101 and having a lens-receiving portion 102a; and a ring-shaped member 103 lying between the depression 101a of the lens 101 and the lens-receiving portion 102a of the lens-holding member 102 when the optical unit is completely inserted as shown in FIG. 16. The ring-shaped member 103 has a thermal plastic property and also a property absorbing near infrared light and, in addition, is composed of a material having an appropriate elasticity so as to climb over an external periphery 101b of the lens 101 and to be fitted into the depression 101a prior to the insertion of the lens unit.

A laser-irradiation apparatus 104 shown in FIG. 16 irradiates the ring-shaped member 103 interposed between the depression 101a of the lens 101 and the lens-receiving portion 102a of the lens-holding member 102 as described above, with laser light (near infrared light) 105, as will be described later, so that the ring-shaped member 103 is melted and the lens 101 is hence fixed to the lens-holding member 102.

A procedure for fixing the lens 101 and the lens-holding member 102 to each other by laser welding will be described.

As shown in FIG. 16, the lens 101 holding the ring-shaped member 103 in the depression 101a having a substantially V-shaped cross-portion is first inserted into the lens-holding member 102. Then, the laser-irradiation apparatus 104 irradiates a plurality of locations of the edge of the lens 101 with the spot-shaped laser light 105. With this arrangement, the laser light 105 passes through the lens 101, and the plurality of locations of the ring-shaped member 103 is irradiated with the laser light 105 substantially at the same time. Since the ring-shaped member 103 is composed of a material absorbent to near infrared light as described above, upon being irradiated with the laser light 105 as described above, the ring-shaped member 103 generates heat by absorbing the laser light 105, thermally expands, is melted, is welded with the lens-receiving portion 102a of the lens-holding member 102, is filled in the depression 101a of the external periphery of the lens 101, and is resultantly closely fixed to the lens 101.

When the laser irradiation is finished, and the irradiation portions are cooled, the ring-shaped member 103 and the lens-receiving portion 102a of the lens-holding member 102 are brought into an integrated state by welding, the ring-shaped member 103 is closely fixed to the depression 101a of the lens 101 in a form of being filled in the depression 101a. As a result, the lens 101 is fixed to the lens-holding member 102 by welding, having the depression 101a interposed therebetween. Accordingly, even when a force is exerted on the lens 101 in a direction of detaching from the lens-holding member 102, the welding portion is formed in a shape of a so-called undercut, thereby providing an excellent fixing feature of preventing the lens 101 from detaching from the lens-holding member 102 against a detaching force.

According to the foregoing sixth embodiment, the lens 101 has the depression 101a disposed at the external periphery thereof; the ring-shaped member 103 fitted into the depression 101a upon insertion of the lens 101 into the lens-holding member 102 and serving as an engagement is composed of a material different from that of the lens-holding member 102; and a plurality of locations of the ring-shaped member 103 is irradiated with the laser light 105, whereby the lens 101 and the lens-holding member 102 are fixed to each other by laser welding. Since the lens 101 and the lens-holding member 102 are fixed to each other by laser welding, having the depression 101a interposed therebetween, these components are fixed at a so-called undercut after the laser welding, whereby the lens unit has excellent fixing features of preventing the lens 101 from detaching from the lens-holding member 102 against a detaching force and hence firmly fixing the lens 101 to the lens-holding member 102.

While the depression 101a is formed at the external periphery of the lens 101 in the above-described sixth embodiment, the present invention is no limited to this arrangement. Even when a depression into which the ring-shaped member 103 is fitted is formed at the internal periphery of the lens-holding member 102, the same advantages can be obtained. Also, although a plurality of the locations of the ring-shaped member 103 is irradiated with laser light, irradiation locations are not limited to the above arrangement, and the ring-shaped member 103 may be irradiated with laser light around the entire circumference thereof.

One skilled in the art will appreciate that the lens 101 may be composed of even a glass or resin material. In the case where the lens 101 is composed of a resin material, upon irradiation with laser light, the melted ring-shaped member 103 causes a part of the resin lens to be melted, whereby the lens 101 and the lens-holding member 102 are laser-welded with each other, having the ring-shaped member 103 interposed therebetween. As described above, the laser welding is carried out through the depression 101a of the lens 101, thereby providing an excellent fixing feature of preventing the lens from detaching from the lens-holding member against a detaching force in the same fashion as described above.

Although no description has been made about the surface of the depression 101a of the lens 101 in the above-described sixth embodiment, the lens may be formed so as to have a rough surface. With this structure, when the lens 101 is composed of a glass material by way of example, the foregoing intermediate member fills in irregularities of the rough surface, whereby the lens 101 is more closely fixed to the lens-holding member 102.

Further, while the lens 101 is subjected to laser welding in a state of being simply inserted in the lens-holding member 102 in the above-described sixth embodiment, those skilled in the art will appreciate that the lens unit may have a structure in which eccentricity and inclination of the lens 101 are adjusted in a state of holding the lens 101, for example, by a vacuum-sucking tool, and, after the adjustment, the lens 101 is subjected to laser welding while the holding state is maintained. On this occasion, since the laser irradiation causes the ring-shaped member 103 to expand thermally, the lens-receiving portion 102a of the lens-holding member 102 and the depression 101a at the external periphery of the lens 101 are subjected to laser welding, thereby providing an excellent fixing feature of preventing the lens from detaching from the lens-holding member against a detaching force in the same fashion as described above.

Seventh Embodiment

Figure 17:
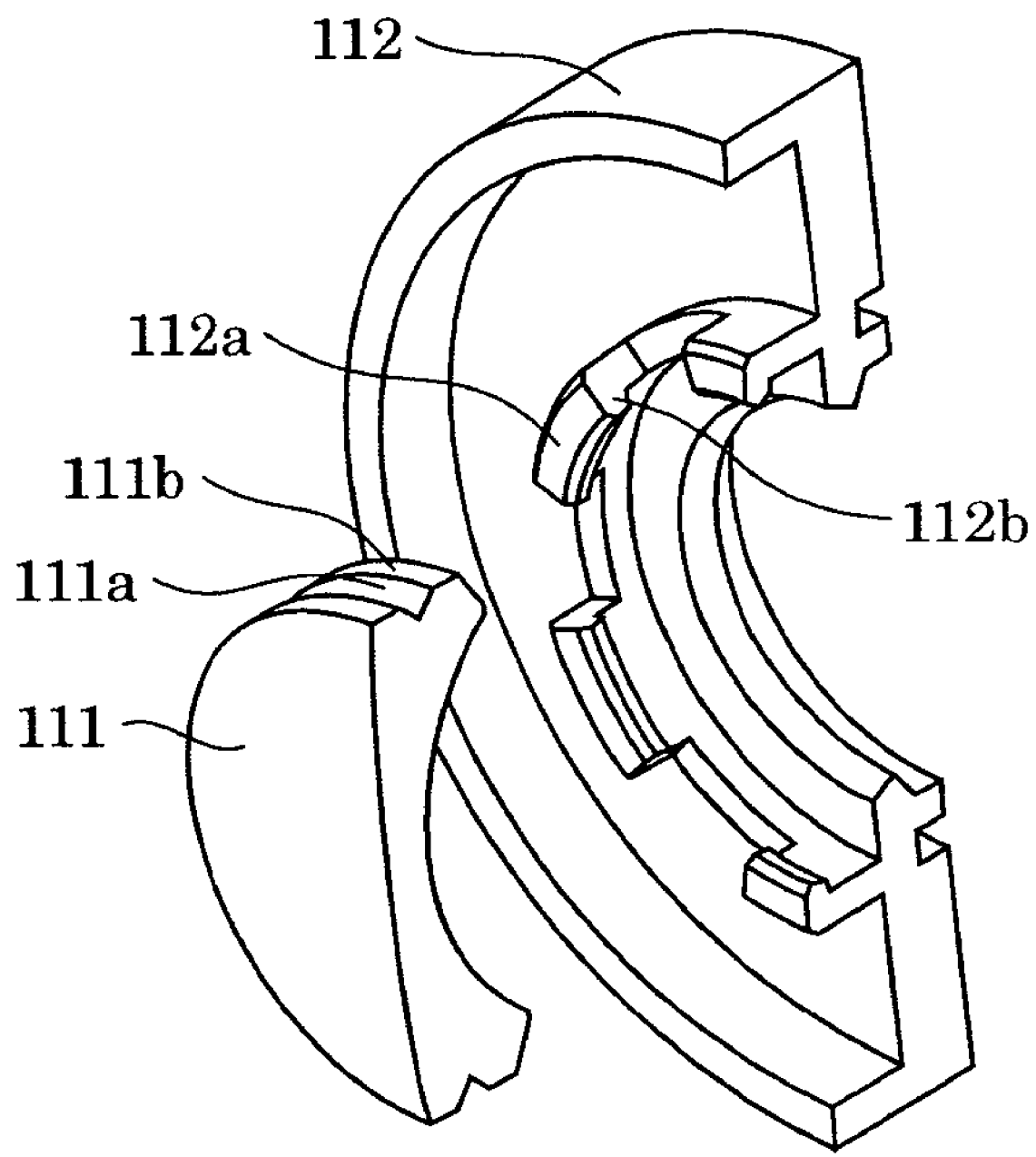
FIG. 17 is a perspective sectional view of a major part of an optical unit according to a seventh embodiment of the present invention.
Figure 18:
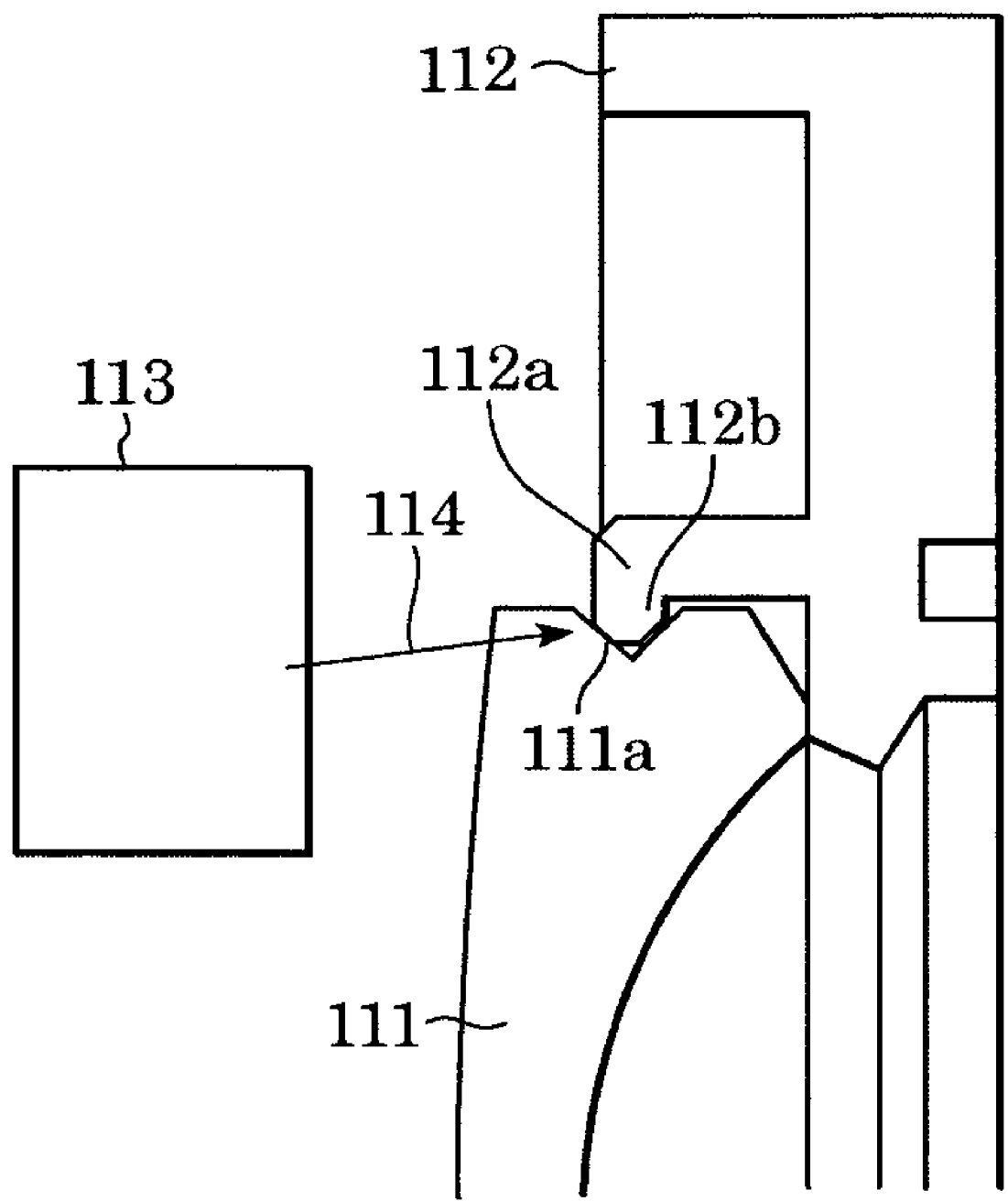
FIG. 18 is a perspective sectional view of a major part of the optical unit according to the seventh embodiment, having a lens inserted therein.

FIGS. 17 and 18 illustrate an optical unit inserted in a camera, according to a seventh embodiment of the present invention. More particularly, FIG. 17 is a perspective sectional view of a major part of the optical unit, and FIG. 18 is a sectional view of a major part of the optical unit in a state of being completely assembled.

As shown in these figures, the optical unit includes a lens 111 serving as one of optical members forming an image of pickup light from a subject onto a pickup element (not shown); and a lens-holding member 112. The lens 111 has a depression 111a formed on the external peripheral surface thereof, having a substantially V-shaped cross-portion. The lens-holding member 112 for holding the lens 111 is composed of a material absorbent to laser light (near infrared light) 114, which will be described later, having a thermoplastic property, and has a plurality of lens-receiving portions 112a protruding in the optical axis direction and formed at a substantially equal interval in the circumferential direction, in addition to having projections 112b protruding in the radial direction, each formed at the top of the respective lens-receiving portion 112a so as to be fitted into the external peripheral depression 111a of the lens 111 as shown in FIG. 18. Further, the projection 112b is formed so as to be elastically deformable so that the projection can climb over an external periphery 111b (see FIG. 17) for insertion into the lens-holding member by a so-called light press-fitting force.

A laser-irradiation apparatus 113 shown in FIG. 18 emits near infrared light 114 as will be described later.

A procedure of fixing the lens 111 and the lens-holding member 112 to each other by laser welding will be described.

As shown in FIG. 18, the lens 111 is first inserted into the lens-holding member 112. Then, the laser-irradiation apparatus 113 irradiates a plurality of locations of the edge of the lens 111 with the spot-shaped laser light 114. With this arrangement, the laser light 114 passes through the lens 111 and causes the plurality of the projections 112b of the lens-holding member 112 to be irradiated therewith substantially at the same time. Since the projections 112b of the lens-holding member 112 irradiated with the laser light 114 as described above are composed of a material absorbent to near infrared light as described above, the projections 112b generate heat by absorbing the laser light 114, expand thermally, are melted, and fill in and are closely fixed to the depression 111a of the lens 111.

When the laser irradiation is finished, and the irradiation portions are cooled, the melted projections 112b of the lens-holding member 112 are solidified in a state of being closely fixed to the depression 111a of the lens 111. As a result, since the lens 111 is fixed to the lens-holding member 112 by welding, having the depression 111a interposed therebetween, even when a force is exerted on the lens 111 in a direction of detachment from the lens-holding member 112, with the welding portion formed in a shape of a so-called undercut, an excellent fixing feature of preventing the lens from detaching from the lens-holding member against a detaching force is provided.

According to the seventh embodiment, the lens 111 has the depression 111a disposed at the external periphery thereof; the projections 112b fitted into the depression 111a upon insertion of the lens 111 into the lens-holding member 112 and serving as engagements are integrally formed with the lens-holding member 112; and a plurality of the projections 112b are irradiated with the laser light 114, whereby the lens 111 and the lens-holding member 112 are fixed to each other by laser welding. Accordingly, since the lens 111 and the lens-holding member 112 are fixed to each other by laser welding, having the depression 111a interposed therebetween, these components are fixed at a so-called undercut after the laser welding, whereby the lens unit has excellent fixing features of preventing the lens 111 from detaching from the lens-holding member 112 against a detaching force and hence firmly fixing the lens 111 to the lens-holding member 112.

One skilled in the art will appreciate that the foregoing lens 111 may be composed of a glass or resin material. In the case where the lens is composed of a resin material, upon irradiation with laser light, the melted projections 112b cause a part of the plastic lens to be melted, and the lens 111 and the lens-holding member 112 are thus laser-welded with each other, having the depression 111a of the lens 111 interposed therebetween as described above, thereby providing an excellent fixing feature of preventing the lens from detaching from the lens-holding member against a detaching force in the same fashion as described above.

While the lens 111 has the depression 111a formed at the external periphery thereof, and the lens-holding member 112 has the projections 112b formed thereon, fitted into the depression 111a and serving as engagements in the seventh embodiment, the present invention is not limited to this arrangement. Even when the lens 111 has depressions formed at the external periphery thereof, and the lens-holding member 112 has a depression formed therein for the depressions to be fitted thereinto, the same advantages can be achieved.

Although no description has been made about the surface of the depression 111a of the lens 111, the lens may be formed so as to have a rough surface. With this structure, when the lens 111 is composed of a glass material by way of example, the foregoing intermediate member fills in irregularities of the rough surface, whereby the lens 111 is more closely fixed to the lens-holding member 112.

Further, while the lens 111 is subjected to laser welding in a state of being simply inserted in the lens-holding member 112 in the seventh embodiment, one skilled in the art will appreciate that the lens unit may have a structure in which eccentricity and inclination of the lens 111 are adjusted in a state of holding the lens 111, for example, by a vacuum-sucking tool, and, after the adjustment, the lens 111 is subjected to laser welding while the holding state is maintained. On this occasion, since the laser irradiation causes the projections 112b to expand thermally, the projections 112b of the lens-holding member 112 and the depression 111a at the external periphery of the lens 111 are laser-welded with each other, thereby providing an excellent fixing feature of preventing the lens from detaching from the lens-holding member against a detaching force in the same fashion as in the above-described sixth embodiment.

Although a lens and lens-holding member included in a pickup optical system are used in the sixth and seventh embodiments, the present invention is not limited to the fixing methods using these components and is applicable to, an example method in which a filter serving as an optical member or a neutral density (ND) filter serving as a member for adjusting an amount of light is fixed to a holding member. Further, those skilled in the art will appreciate that the present invention is applicable to any type of fixing method even when the fixing method is different from the foregoing embodiments or those of fixing the above-described optical members as long as it meets the spirit of the invention.

Eighth Embodiment

Figure 19:
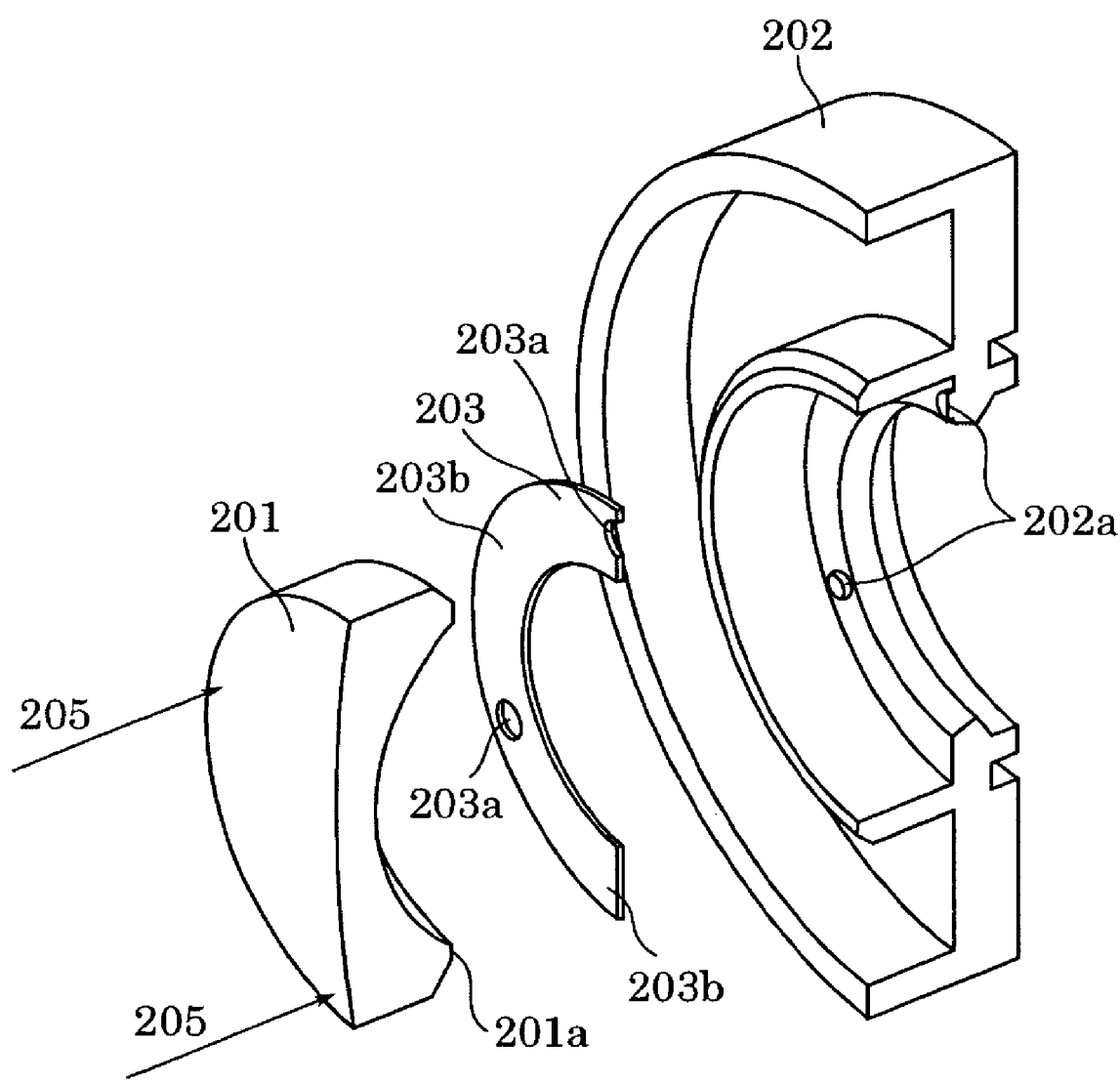
FIG. 19 is a perspective sectional view of a major part of an optical unit according to an eighth embodiment of the present invention.

FIG. 19 is a perspective sectional view of a major part of an optical unit according to an eighth embodiment of the present invention. The optical unit includes a lens 201 serving as one of optical members forming an image of pickup light from a subject onto a pickup element (lying out of the figure); a lens-holding member 202 for holding the lens 201; and a ring-shaped member 203 serving as an intermediate member interposed between the lens 201 and the lens-holding member 202 upon insertion of the lens into the lens-holding member. The ring-shaped member is composed of a material shielding visible light and serves also as an optical diaphragm shielding light other than the pickup light and harmful light reflected from mechanical components around the ring-shaped member and those lying out of the figure. In addition, the ring-shaped member has a thermoplastic property and also a property absorbing near infrared light.

The lens-holding member 202 has abutment projections 202a, against which a bearing-surface 201a of the lens 201 is abutted upon insertion of the lens into the lens-holding member, formed at three locations thereof (one of them is not shown) in the circumferential direction at an almost equal interval and defining the position of the lens in the optical direction. The ring-shaped member 203 has three runoffs 203a formed at three locations thereof (one of them is not shown) so as to correspond to, but not to interfere with the above-mentioned projections 202a. The ring-shaped member is set so as to have a thickness slightly smaller than the projecting amount of the projections 202a. With this setting, when the lens 201 is inserted into the lens-holding member 202, in a state of the bearing-surface 201 of the lens 201 being abutted against the projections 202a, the ring-shaped member 203 is inserted into the lens-holding member 202 while the lens 201 and the lens-holding member 202 have a slight gap therebetween.

Figure 20:
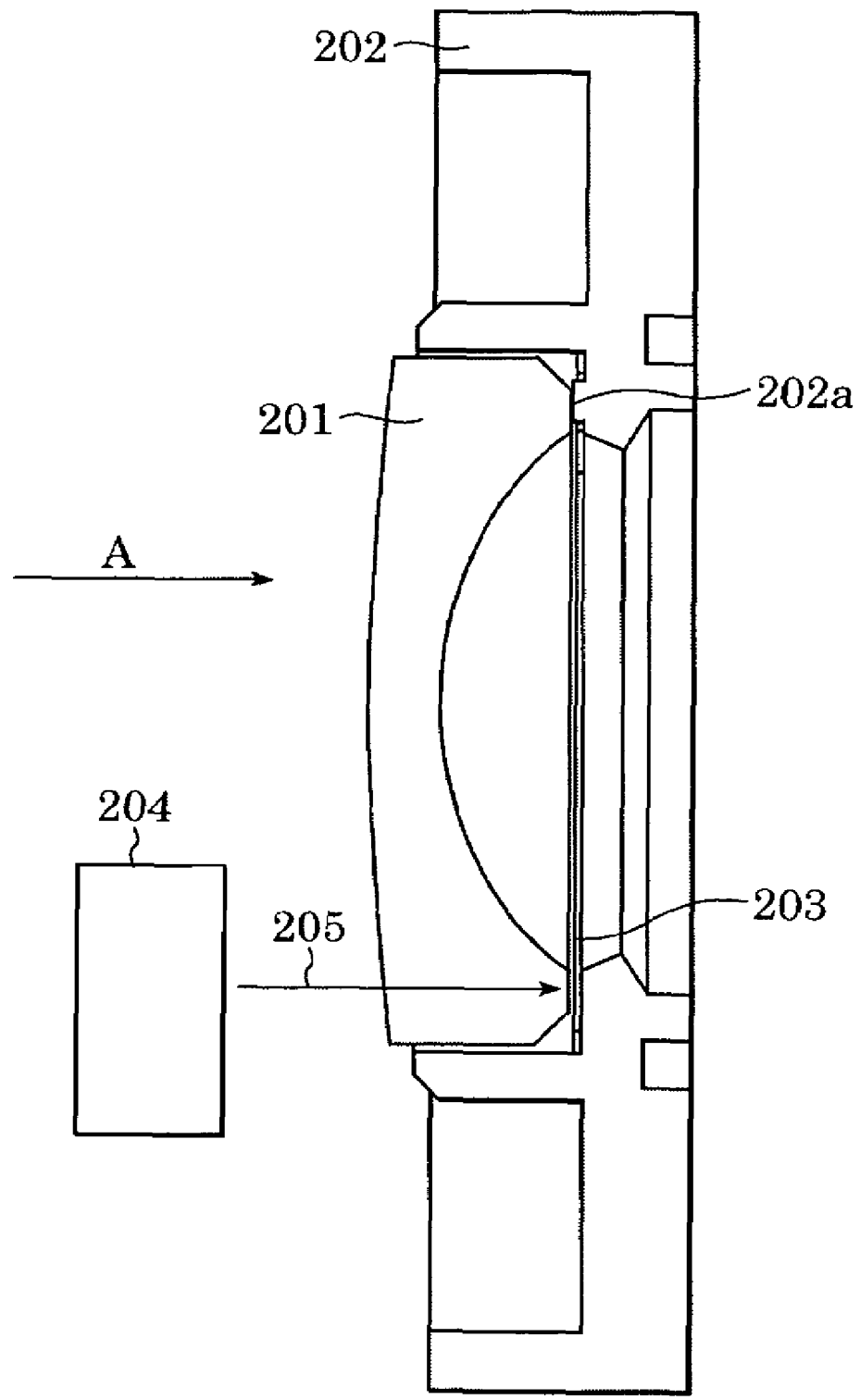
FIG. 20 is a sectional view of the optical unit according to the eighth embodiment, illustrating its state in which a lens-holding member has a lens and a ring-shaped member inserted therein.

FIG. 20 is a sectional view of a major part of the optical unit in a state in which the lens 201 and the ring-shaped member 203 are inserted in the lens-holding member 202. When a laser irradiation apparatus 204 emits near infrared light, as will be described later, the ring-shaped member 203 is melted such that the lens 201 is fixed to the lens-holding member 202.

In accordance with the lens fixing method according to the present embodiment, the lens 201 and the lens-holding member 202 are fixed to each other by laser welding in the following order.

In a state in which, the lens 201 is inserted in the lens-holding member 202, having the ring-shaped member 203 interposed therebetween as described above, spot-shaped laser light 205 emitted from the laser-irradiation apparatus 204 passes through the lens 201 first, and three locations of the ring-shaped member 203 other than the three runoffs 203a, more particularly, three locations shown by reference number 203b in FIG. 19 (one of them is not shown), lying on the circumference and being out of about half-phase with the three runoffs 203a, are irradiated with the laser light 205 substantially at the same time. Because of being composed of a material absorbent to near infrared light as described above, upon absorbing the spot-shaped laser light, the ring-shaped member 203 generates heat and is melted. On this occasion, the melted ring-shaped member 203 thermally expands so as to fill in the above-mentioned gap between the lens 201 and the lens-holding member 202, whereby the melted ring-shaped member 203 is closely fixed to the bearing-surface 201 of the lens 201 and also causes the lens-holding member 202 to be melted so that these two components are welded with each other. The process of laser irradiation is completed at this stage.

When the laser irradiation is finished and cooling of the irradiated components starts, although the welding portions of the ring-shaped member 203 and the lens-holding member contract due to the cooling, since the welding portions of the ring-shaped member 203, the lens-holding member 202, and the lens 201 are integrated into one unit by the welding; hence, the welding portions cannot contract by a volume corresponding to the above-mentioned gap. As a result, a force is generated due the contraction in a direction (A direction indicated in FIG. 20) in which the bearing-surface 201 of the lens 201 is pressed against the abutment projections 202a of the lens-holding member 202, and, after the laser welding, remains so as to press the bearing-surface 201 of the lens 201 and the abutment projections 202a of the lens-holding member 202 to each other, thereby accurately fixing the lens 201 to the lens-holding member 202.

In the above-described embodiment, while the lens 201 and the lens-holding member 202 are laser-welded with each other, having the ring-shaped member 203 interposed therebetween, such that there remains a force generated due to contraction actions, caused by cooling, of the welding portions of the ring-shaped member 203 and the lens-holding member 202, pressing the bearing-surface 201 of the lens 201 against the abutment projections 202a of the lens-holding member 202, another force moving the lens 201 in the radial direction is not generated. Hence, those skilled in the art will appreciate that the lens 201 can be subjected to adjustments such as a so-called eccentric adjustment for guarantee of its optical performance.

Also, while laser irradiation is applied to three locations in the above-described embodiment, the irradiation locations are not limited to the above arrangement, and locations of irradiation and the number of locations can be arbitrarily set as long as these locations lie in disagreement with the runoffs 203a formed at at least three locations of the ring-shaped member 203.

Those skilled in the art will appreciate that the foregoing lens composed of a glass or resin material is not contrary to the spirit of the present invention. In the case where the lens is composed of a resin material, upon laser irradiation, the melted intermediate member causes a part of the resin lens to be melted, whereby the lens and the lens-holding member are laser-welded with each other, having the intermediate member therebetween.

Although no description has been made about the surface of the bearing-surface 201a of the lens 201, the bearing-surface 201a may be formed so as to be rough. With this structure, when the lens 201 is composed of a glass material by way of example, the foregoing intermediate member fills in irregularities of the rough surface, whereby the lens 201 is more closely fixed to the lens-holding member 202.

Ninth Embodiment

Figure 21:
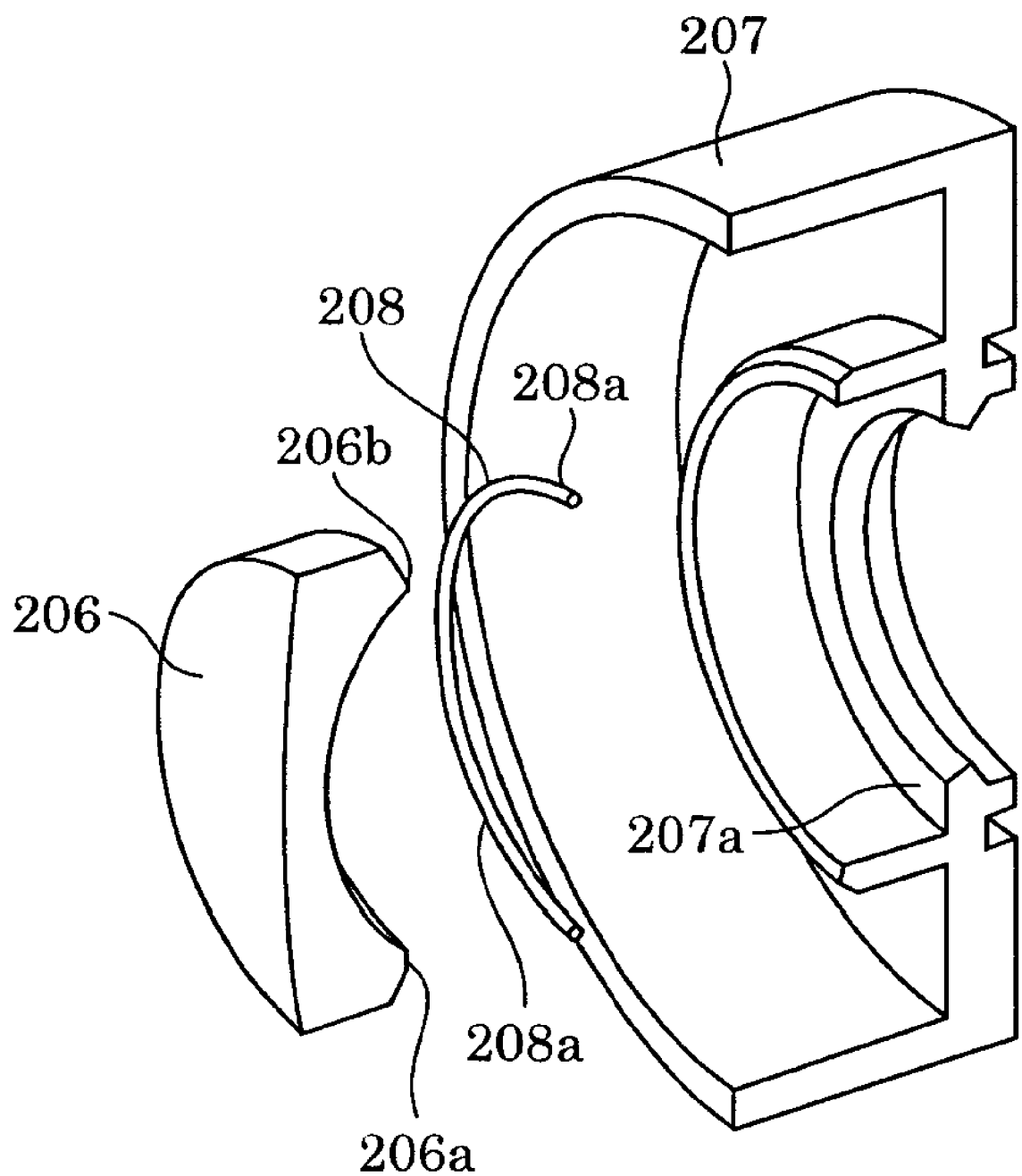
FIG. 21 is a perspective sectional view of a major part of an optical unit according to a ninth embodiment of the present invention.

FIG. 21 is a perspective sectional view of a major part of an optical unit according to a ninth embodiment of the present invention. The optical unit includes a lens 206 serving as one of optical members forming an image of pickup light from a subject onto a pickup element lying out of the figure; a lens-holding member 207 for holding the lens; and a ring-shaped member 208 having a substantially round cross-portion and serving as an intermediate member, which is inserted into a gap produced upon insertion of the lens, between a slope 206b formed at the bottom of the external periphery of the lens 206 and a lens-abutment surface 207a of the lens-holding member 207. In the present embodiment, the ring-shaped member 208 has a thermoplastic property and also a property absorbing near infrared light.

Figure 22:
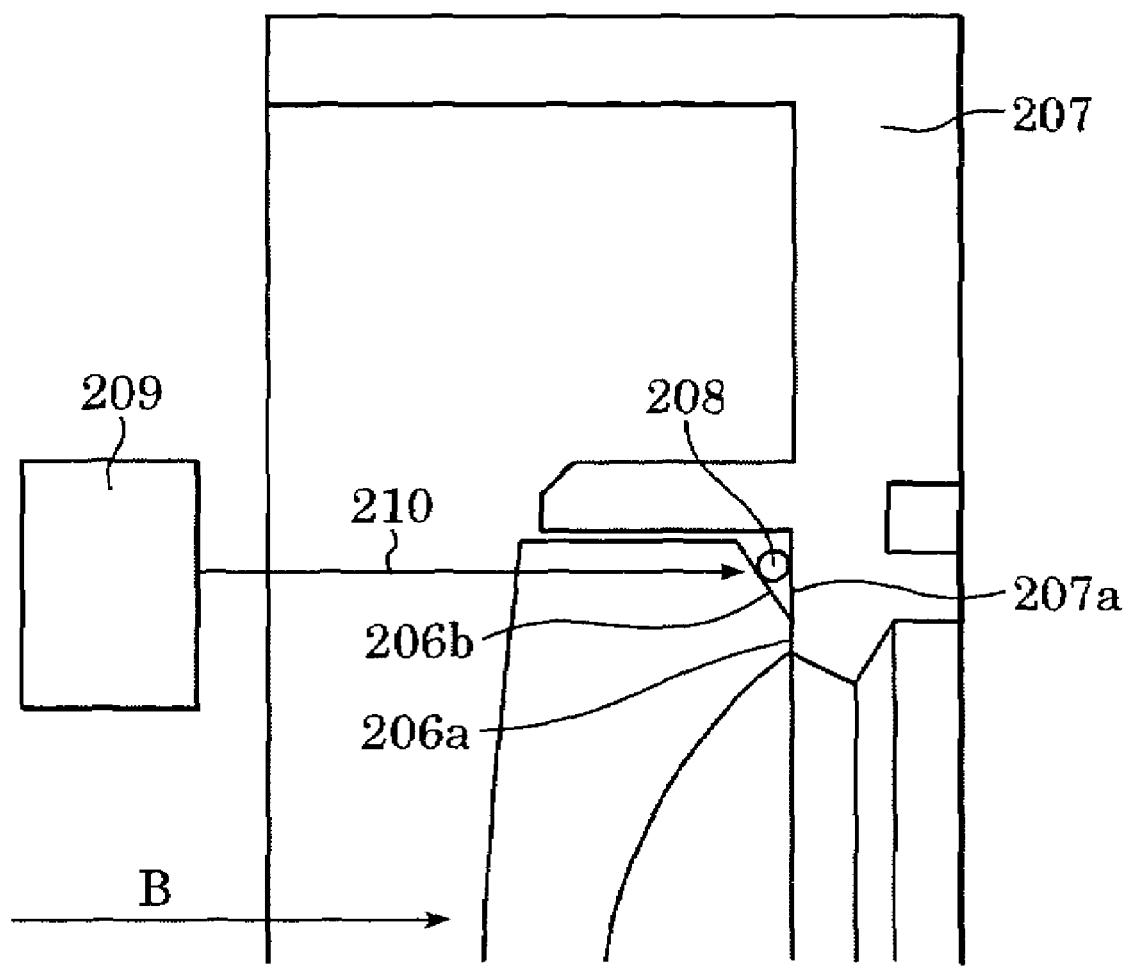
FIG. 22 is a sectional view of the optical unit according to the ninth embodiment, illustrating its state in which a lens-holding member has a lens and a ring-shaped member inserted therein.

FIG. 22 is a sectional view of a major part of the optical unit, illustrating its state in which the lens 206 and the ring-shaped member 208 are inserted in the lens-holding member 207. As shown in the figure, the ring-shaped member 208 is inserted in the gap produced between the slope 206b formed at the bottom of the external periphery of the lens 206 and the lens-abutment surface 207a of the lens-holding member 207. On this occasion, the ring-shaped member 208 has a slight gap relative to the slope 206b and the abutment surface 207a. When a laser-irradiation apparatus 209 shown in the figure emits near infrared light, as will be described later, the ring-shaped member 208 is melted, thereby fixing the lens to the lens-holding member.

In accordance with the lens fixing method according to the present embodiment, the lens 206 and the lens-holding member 207 are fixed to each other by laser welding in the following order in substantially the same fashion as in the first embodiment.

As shown in FIG. 22, in a state in which the lens 206 and the ring-shaped member 208 are inserted in the lens-holding member 207, spot-shaped laser light 210 emitted from the laser-irradiation apparatus 209 passes through the lens 206 first, and a plurality of locations, more particularly, for example, at least three locations shown by reference numeral 208a in FIG. 21 (one of them is not shown) of the ring-shaped member 208, lying in the circumferential direction at an almost equal interval are irradiated with the laser light substantially at the same time.

Because of being composed of a material absorbent to near infrared light as described above, upon absorbing the spot-shaped laser light, the ring-shaped member 208 subjected to laser irradiation generates heat and is melted. On this occasion, the melted ring-shaped member 208 expands thermally so as to fill in the gap between the slope 206b formed at the bottom of the external periphery of the lens 206 and the lens-abutment surface 207a of the lens-holding member 207, is closely fixed to the slope 206b at the bottom of the external periphery of the lens and also causes the lens-holding member 207 to be melted. The process of laser irradiation is complete at this stage.

When the laser irradiation is finished and cooling of the irradiated components starts, although the welding portions of the ring-shaped member 208 and the lens-holding member contract due to the cooling, since the welding portions of the ring-shaped member 208, the lens-holding member 207, and the lens 206 are integrated into one unit by the welding, the welding portions cannot contract by a volume corresponding to the above-mentioned gap. As a result, a force is generated due to the contraction in a direction (B direction indicated in FIG. 22) in which a bearing-surface 206a of the lens 206 is pressed against the abutment projections 207a of the lens-holding member 207, and the force of pressing the bearing-surface 206a of the lens 206 and the abutment surface 207a of the lens-holding member 207 to each other remains after the laser welding, thereby accurately fixing the lens 206 to the lens-holding member 207.

In the eighth and ninth embodiments, while the lens 206 and the lens-holding member 207 are laser-welded, having the ring-shaped member 208 interposed therebetween, such that there remains a force generated due to contraction actions, caused by cooling, of the welding portions of the ring-shaped member 208 and the lens-holding member 207, pressing the bearing-surface 206a of the lens 206 against the abutment surface 207a of the lens-holding member 207, another force moving the lens 206 in the radial direction is not generated. Hence, those skilled in the art will appreciate that the lens 206 can be subjected to adjustments such as a so-called eccentric adjustment for guarantee of its optical performance.

Further, those skilled in the art will appreciate that even when the lens 206 described in the eighth and ninth embodiments is composed of a glass or resin material, the lens is not contrary to the spirit of the present invention. In the case where the lens is composed of a resin material, upon laser irradiation, the melted intermediate member causes a part of the resin lens to be melted, whereby the lens and the lens-holding member are laser-welded with each other, having the intermediate member therebetween.

Although no description has been made about the surface of the slope 206b formed at the bottom of the external periphery of the lens 206, the lens 206b may be formed so as to rough. With this structure, when the lens 206 is composed of a glass material by way of example, the foregoing intermediate member fills in irregularities of the rough surface, whereby the lens 206 is more closely fixed to the lens-holding member.

While laser irradiation is applied to the three locations in the eighth and ninth embodiments, irradiation locations are not limited to the above arrangement.

Also, although a lens and a lens-holding member included in a pickup optical system are used in the eighth and ninth embodiments, the present invention is not limited to the fixing methods using these components and is applicable to, for example, a method in which a filter serving as an optical member or a neutral density (ND) filter serving as a member for adjusting an amount of light is fixed to a holding member. Further, those skilled in the art will appreciate that the present invention is applicable to any type of fixing method even when the fixing method is different from the foregoing two embodiments or those of fixing the above-described optical members as long as it falls in the spirit of the invention.

Further, with respect to the fixing method for fixing, for example, a pickup lens and a holding member for holding the pickup lens to each other by laser welding, according to each of the eighth and ninth embodiments, the lens and the holing member are laser-welded in a state in which these components have an intermediate member interposed therebetween, having a thermoplastic property. On this occasion, the intermediate member is arranged so as to not lie on a plane defining the positions of the lens and the holding member in the optical axis direction, and is also set so as to have a slight gap upon insertion. With this structure, upon laser-welding, the intermediate member expands thermally so as to fill in the gap, and is welded with the lens-holding member, and then with the lens. Although welding portions of the intermediate member and the lens-holding member contract caused by cooling after the welding, since the intermediate member, the lens-holding member, and the lens are integrated into one unit, these components cannot contract by a volume corresponding to the foregoing gap. As a result, a stress remains in the lens so as to press the lens against the holding member, thereby achieving an accurate and reliable lens unit.

With this arrangement, heat generated due to laser welding does not affect the abutment surface between the optical member and the holding member after the laser welding, thereby accurately fixing the optical member.

Also, the intermediate member inserted between the optical member and the holding member is arranged so as to have a gap between these components upon insertion and is composed of a thermoplastic material absorbent to near infrared light, thereby accurately fixing the optical member.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Applications No. 2004-132602 filed Apr. 28, 2004, No. 2004-132601, filed Apr. 28, 2004, and No. 2004-163922 filed Jun. 2, 2004, which are hereby incorporated by reference herein.

What is claimed is:

1. A method for fixing an optical member to a holding member, comprising the steps of:
   inserting the optical member in the holding member having a plurality of contact portions and a plurality of laser irradiation portions, wherein the inserting step includes inserting the optical member in the holding member such that the optical member contacts the plurality of contact portions but does not contact the plurality of laser irradiation portions; and
   irradiating the holding member with a plurality of beams of laser light substantially at the same time such that the beams of laser light pass through the optical member to irradiate the plurality of laser irradiation portions but not irradiate the plurality of contact portions.

2. The method for fixing the optical member according to claim 1, wherein the plurality of contact portions protrudes more than the plurality of laser irradiation portions, and
   wherein the irradiating step includes melting the plurality of laser irradiation portions with the beams of laser light so as to contact with the optical member.

3. The method for fixing the optical member according to claim 1, wherein the plurality of contact portions protrudes more than the plurality of laser irradiation portions,
   wherein, upon insertion of the optical member in the holding member in the inserting step, a clearance is defined between the plurality of laser irradiation portions and the optical member, and
   wherein the irradiation step includes melting the plurality of laser irradiation portions with the beams of laser light to make the clearance smaller.

4. The method for fixing the optical member according to claim 1, wherein each of the plurality of laser irradiation portions includes a partially protruding portion,
   wherein, upon insertion of the optical member in the holding member in the inserting step, the partially protruding portion contacts the optical member, and
   wherein the irradiating step includes melting the partially protruding portion with the beams of laser light to contact with the optical member.

5. The method for fixing the optical member according to claim 1, wherein the plurality of laser irradiation portions has a thickness-reduced portion at a rear surface thereof such that the laser irradiation portions have greater elasticity than the plurality of contact portions.

6. The method for fixing the optical member according to claim 1, wherein the plurality of laser irradiation portions has cuts formed therearound such that the laser irradiation portions have greater elasticity than the plurality of contact portions.

7. A holding member holding an optical member and fixed by a laser irradiation process, the holding member comprising:
- a plurality of positioning portions adapted to contact with the optical member so as to position the optical member prior to the laser irradiation process; and
- a plurality of laser irradiation portions being irradiated with laser light in the laser irradiation process, wherein the laser irradiation portions do not contact with the optical member prior to the laser irradiation process,
- wherein the positioning portions and the laser irradiation portions are positioned opposing a single plane of the optical member, wherein prior to the irradiation process, the positioning portions protrude more than the laser irradiation portions such that the laser irradiation portions do not contact with the optical member, and wherein, in the laser irradiation process, the laser irradiation portions melt and come into contact with the optical member.

8. The holding member according to claim 7, wherein each laser irradiation portion includes a projection protruding lower than the positioning portion such that the projection does not contact with the optical member prior to the laser irradiation process.

9. The holding member according to claim 7, wherein the laser irradiation portions are thinner than the positioning portions.

10. The holding member according to claim 7, wherein each laser irradiation portion includes a thickness-reduced portion at a rear surface thereof.

11. The holding member according to claim 7, wherein each laser irradiation portion includes a cut defined therearound.

12. An optical unit, comprising:
- an optical member having a groove defined around an external periphery thereof;
- a holding member holding the optical member and having a wall formed therein so as to face the external periphery of the optical member; and
- an intermediate member disposed between the external periphery of the optical member and the wall of the holding member, the intermediate member having an elastic ring shape adapted to fit into the groove, the intermediate member including a thermoplastic resin absorbent to laser light such that at least a part of the intermediate member is melted upon irradiation with laser light passing through the optical member so as to fix the optical member to the holding member.

* * * * *